Dec. 30, 1969 P. O. CLARK 3,487,327
FREQUENCY STABILIZED LASER
Filed Nov. 1, 1967

INVENTOR.
PETER O. CLARK,
BY
ATTORNEY.

United States Patent Office 3,487,327
Patented Dec. 30, 1969

3,487,327
FREQUENCY STABILIZED LASER
Peter O. Clark, Malibu, Calif., assignor to Hughes Aircraft Company, Culver City, Calif., a corporation of Delaware
Filed Nov. 1, 1967, Ser. No. 679,711
Int. Cl. H01s 3/00, 3/10, 3/22
U.S. Cl. 331—94.5
8 Claims

ABSTRACT OF THE DISCLOSURE

This invention relates to a frequency stabilized laser utilizing a tunable laser oscillator that oscillates simultaneously at two spaced transition lines; one of these is the output transition and is centered on a cavity resonance and the other is a control transition and is located to one side of another cavity resonance to provide a frequency discriminant signal when the control transition is detected by splitting the transistions into two separate beams downstream of the oscillator. The discriminant is then coupled to the frequency adjusting portion of the laser oscillator to correct for any deviations from a preset condition.

---

The need for and advantages of a stabilized laser source of oscillation is well known in the radio frequency (RF) electromagnetic energy art. The need for and advantages of such a source of oscillation also applies to the much higher, near optical and optical frequency range generators such as lasers, for example, but is much more difficult to attain. A stabilized laser oscillator is extremely useful in a linear measurement system and also has many advantageous metrological applications. Furthermore, it can be used as a source to make accurate gain-linewidth measurements and investigations of single atom coherence effects in lasers.

Ordinary electromagnetic RF oscillators are usually stabilized by referencing to some stable controlling element such as a piezoelectric crystal. The crystal oscillator is intrinsically orders of magnitude more stable than the frequency determining elements in the oscillator such as LC circuit parameters. The problem with optical oscillators is that there are no known frequency determining elements related to lasers as crystals are related to LC oscillators. One drawback of most laser oscillators to date is that the actual oscillation frequency is determined to the first order by the cavity spacing. This means that such a laser oscillator capable of extremely high purity frequency output over a long time period is limited by the mechanical stability of the cavity. The two principle causes of mechanical instability are microphonics, including acoustic effects, and thermodrift. A third possible source of drift is atmospheric pressure changes which can be neglected here since it can easily be eliminated by conventional means.

The usual way to stabilize a laser oscilaltor has been to isolate it from thermo and mechanical shock. Usually this involves immersing a laser cavity in as nearly a constant temperature bath as possible, such as a controlled temperature and humidity room and mounting the laser cavity on a vibration-free and isolated platform, sometimes located underground. The cavity mirrors have also been mounted internally with respect to the laser in order to remove fluctuations due to perturbations in the cavity, such as scattering from dust particles, etc., that afflict Brewster angle lasers with externally mounted mirrors, for example. Generally, isolation methods have proved to be impractical for most applications.

Feedback systems have also been used in an effort to obtain satisfactory stabilization. In an early attempt to gain the desired goal, a servo system was devised to keep the total output intensity at a maximum. However, this technique proved to be too insensitive to stabilize the oscillator to within better than some tens of megacycles. Later, experiments were conducted where an error signal was produced by oscillating one of the reflectors comprising the resonant cavity of the laser at an audio rate and directing a portion of the laser output at a photodetector, the output of which was phase detected to provide a DC voltage proportional to the derivative of the curve of output power plotted against frequency. The laser output was then locked to one of three zero slope points resulting from a center tuning dip by properly applying this feedback signal to the oscillation reflector. The drawback here was that the laser beam was frequency modulated.

Subsequently, much improved schemes were devised that basically derived their error signals from a laser transition's absorption- or gain-frequency profile. One of these methods was to use a switching technique in the optical path by providing two optical paths traversing, in opposite directions, a line shifting cell; another was by Zeeman splitting the laser energy generated and detecting and comparing the intensities of oppositely propagating laser beams to provide an error signal to a frequency adjusting portion of the resonant cavity for stabiilzation purposes. For a more detailed review of the prior art, articles of the type written by A. D. White in the IEEE Journal of Quantum Electronics, vol. QE-1, No. 8, November 1965, may be consulted.

In contrast to the prior laser stabilization art as above described, the invention has the advantage of eliminating the need for switching elements or the need for line shifting absorption cells. It has the further advantage that the cavity mirrors need not be modulated in order to provide an error signal and does not use the Zeeman-splitting effect so that laser materials not exhibiting this effect may be used in the stabilized laser system.

It is therefore an object of the present invention to provide an improved stabilized laser oscillator.

It is another object of the invention to provide a stabilized laser oscillator that does not incorporate a switching element in the optical path or an absorption cell and that may utilize materials that do not exhibit Zeeman effects such as molecular gases.

These and other objects of the invention are obtained, according to one embodiment of the invention, in a frequency stabilized laser wherein a laser oscillator capable of producing at least two simultaneously oscillating transitions in a laser beam includes a resonant cavity having a length such that one cavity resonance is located at approximately the center of a first transition line desired to be frequency stabilized and another cavity resonance is located on the side of a second transition line and such that only a single cavity mode exists within each transition linewidth. The oscillator further includes a means responsive to an error signal for controlling the oscillating frequency of the transitions. The laser beam so produced is separated into an output beam carrying energy of the first transition line and a control beam carrying energy of the second transition line. A detector is positioned in the path of the control beam and provides an output signal whose magnitude is dependent upon the intensity of the control beam. The detected signal is then amplified and presented to the frequency controlling means such as a piezoelectric crystal or other electromechanical transducer mounted on one of the reflectors of the resonant cavity so as to adjust the oscillating frequency of the transitions to minimize any deviations from a predetermined frequency.

The invention and specific embodiments thereof will be described hereinafter by way of example and with reference to the accompanying drawings wherein like reference numerals refer to like elements or parts and in which.

Figure 2:
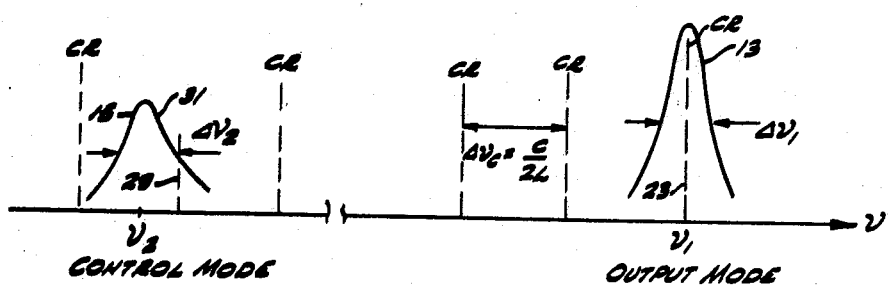
FIG. 2 illustrates graphically the production of the two transition lines and the position of the resonant cavity resonances.
Figure 1:
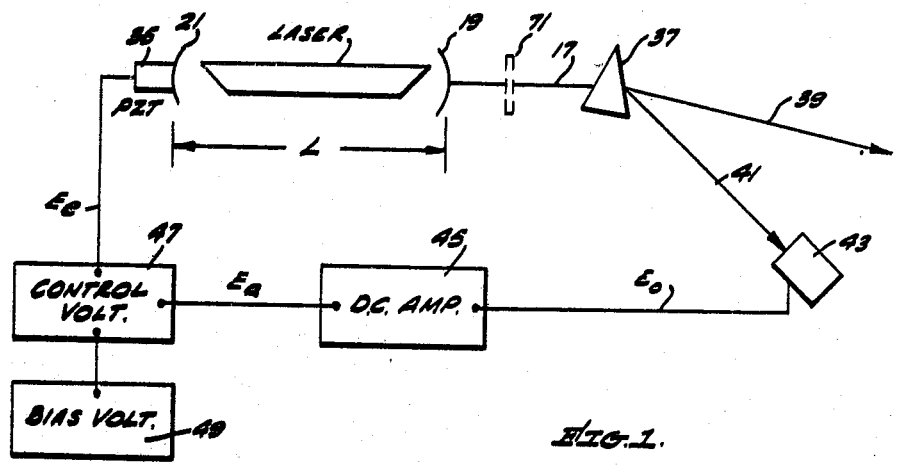
FIG. 1 is a schematic diagram of a preferred embodiment of the invention.

With reference now to the drawings and more particularly to FIGS. 1 and 2, there is shown a laser oscillator 11 capable of producing at least two simultaneously oscillating transitions 13 and 15 having center frequencies $\nu_1$ and $\nu_2$, respectively, in a laser beam 17. The oscillator 11 includes a resonant cavity comprising a partially transmissive mirror 19 and a substantially reflective mirror 21. The distance between the mirrors 19 and 21 is herein designated by the letter L which represents a length such that one cavity resonance 23 is located at approximately $\nu_1$ at the center of the first transition line 13 desired to be frequency stabilized and another cavity resonance 29 located on a side or slope 31 of the second transition line 15. The oscillator further includes a means for controlling the oscillating frequency of the transitions such as a piezoelectric crystal 35 attached to the mirror 21. A dispersive means such as a prism 37 is positioned to intercept the laser beam 17 for the purpose of separating the two oscillating transistions 13 and 15 into an output beam 39 and a control beam 41, respectively. Of course, grating or reflection filter could be substituted for the prism shown. The control beam 41 is intercepted by a detector 43 which provides an output signal $E_o$, the magnitude of which is dependent upon the intensity of the control beam 41. The output signal $E_o$ from the detector is a DC voltage of a single polarity referenced to a ground potential. This output signal is amplified ($E_a$) by a DC amplifier 45 and then coupled to a control voltage amplifier 47 in this embodiment. A bias voltage source 49 is also coupled to the control voltage amplifier 47 to act as a reference, as will be explained later, and the output from the amplifier 47 is an error signal $E_e$ that is coupled to the piezoelectric crystal 35.

It is important for the proper operation of this device that a certain condition be satisfied. The condition is that only a single cavity mode must exist within each transition linewidth. For example, the cavity length L may be chosen such that the spacing ($\Delta\nu_C = c/2L$) between consecutive cavity resonances CR's is larger than the widths of the output ($\Delta\nu_1$) and control ($\Delta\nu_2$) lines, where $c$ is the speed of light and the frequency bandwidths, $\Delta\nu_1$ and $\Delta\nu_2$, are taken at the half-power points of the transition lines.

In initially setting up the device shown in FIG. 1 for operation, the output beam 39 is detected by detector 43 or another detector and the cavity length L adjusted mechanically or by adjusting the bias voltage from the source 49 so that the output power of the output beam 39 is a maximum. This places the cavity resonance 23 at the peak of the output transition line 13. With this condition present, the output signal $E_o$ is considered to produce a zero error signal $E_e$. In a manner well known in the art, this error signal $E_e$ is coupled to the transducer 35 and has a magnitude and direction so as to correct for deviations from this reference point. Thus, it can be seen from FIGS. 1 and 2 that when the resonant cavity contracts (L decreases), the frequency of the output beam 39 will shift towards a higher frequency and will be simultaneously accompanied by a decrease in the intensity of the control beam 41 (cavity resonance 29 moves further down the slope 31 of the transition line 15) as detected by the detector 43. Similarly, an expansion of the cavity causes the frequency of the output beam 39 to decrease in frequency and the control beam 41 to increase in amplitude.

Figure 3:
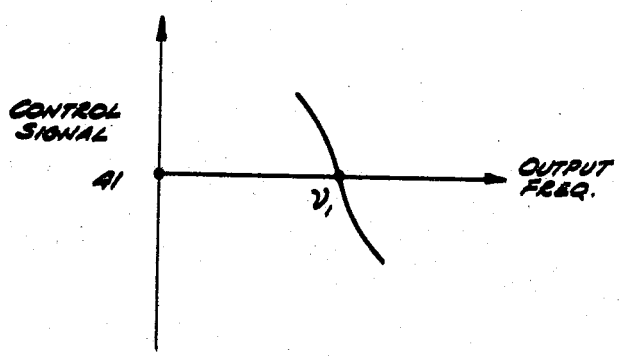
FIG. 3 shows the frequency discriminant curve comparing the controlled voltage against the output frequency.

The resulting frequency discriminant is shown in FIG. 3.

As an alternative embodiment to that shown in FIG. 2, a control arrangement incorporating the functions of the DC amplifier 45, the bias voltage source 49 and the control voltage amplifier 47 may be used as a substitute for these separately mentioned elements. In this regard, where the cavity length L is adjusted mechanically, the bias source 49 can be used as a fine tuning element or it may be found that it can be deleted in certain cases. It should also be understood that the control voltage amplifier may also be deleted in some cases and then the amplified signal $E_a$ will set as the error signal $E_e$.

The active laser material in the laser 11 may be in any physical state, composition or mixture of compositions having the required characteristics as related above. However, this frequency stabilizaztion technique is especially applicable to the high power 10.6$\mu$ $CO_2$ gas laser. Since this is a molecular gas laser, there is no Zeeman effect and at 10.6$\mu$ there are few low-loss electro-optic materials. However, the $CO_2$ laser easily oscillates simultaneously on more than one transition (generally more than one P-branch rotational transition of the 00°1–10°0 vibrational band is present in the output of a high power $CO_2$ laser). In addition, the linewidths of the laser transitions are sufficiently narrow (60–80 mHz.) that the laser 11 may be up to approximately 2 m. long and still satisfy the condition that only one cavity resonance fall within the linewidth of a laser transition. The spacing between the simultaneously oscillating transitions ($\sim$50 gHz.) makes it relatively simple to choose a cavity length so that the resonances fall as indicated in FIG. 2. As to this, however, the technique of mode selection using conventional mode selection filters, such as filter 71, may be used to provide a stabilized laser according to the invention where the spacing between the simutaneously oscillating transitions would otherwise be undesirable.

Using a $CO_2$ laser line near 10.6$\mu$ as a control wavelength requires the use of a cooled semiconductor detector 43 (e.g., liquid helium cooled Cu:Ge). This may be disadvantageous in some system applications. However, this problem may be circumvented by introducing a small amount of xenon into the laser. Since the standard $CO_2$ contains large amounts of helium, a condition which exists in the He—Xe laser, and since the xenon laser has extremely high gain, the He—Xe transitions will oscillate simultaneously with those of the $CO_2$ laser. Then the 3.5$\mu$ He—Xe laser line can be used with a conventional room temperature photodetector to provide the control signal.

It should also be obvious that by varying the bias or reference, the laser output beam 39 may be stabilized at a point within its linewidth other than at its peak.

From the foregoing, it should be seen that the invention provides an improved stabilized laser oscillator that does not require that one of the cavity mirrors be modulated in order to provide an error signal and that may be used with active laser materials not exhibiting Zeeman-splitting effects.

In practicing the invention, any laser oscillator configuration may be substituted for the laser oscillator 11 described herein whether a solid, gas or solid-state device. It should also be understood that any element or elements which exhibit the same characteristics as described for the various elements utilized and shown in the drawings may be substituted therefor. For example, rare earth fluoride lasers may be utilized since they have the inherent capability to oscillate at more than one frequency. However, these lasers have very wide linewidths and thus will require the mode selection technique above mentioned.

It is intended that the foregoing disclosure and drawings shall be considered only as illustrations of the principles of this invention and are not to be construed in a limiting sense.

What is claimed is:

1. A frequency stabilized laser, comprising:

a laser oscillator capable of producing at least two simultaneously oscillating transitions in a laser beam, said oscillator including a resonant cavity having a length such that one cavity resonance is located at approximately the center of a first transition line desired to be frequency stabilized and another cavity resonance located on the side of a second transition line such that only a single cavity mode exists within each transition linewidth, said oscillator further including frequency controlling means responsive to an error signal for controlling the oscillating frequency of said transitions;

dispersive means coupled to said laser beam for separating said two oscillating transitions into an output beam carrying energy of said first transition line and a control beam carrying energy of said second transition line; and means coupled to said control beam for detecting said control beam and providing said error signal to adjust the oscillating frequency of said transitions and thereby minimize deviations from a predetermined frequency.

2. A frequency stabilized laser, comprising:

a laser oscillator capable of producing at least two simultaneously oscillating transitions in a laser beam, said oscillator including a resonant cavity having a length such that one cavity resonance is located at approximately the center of a first transition line desired to be frequency stabilized and another cavity resonance located on the side of a second transition line such that only a single cavity mode exists within each transition linewidth, said oscillator further including frequency controlling means responsive to an error signal for controlling the oscillating frequency of said transitions;

dispersive means coupled to said laser beam for separating said two oscillating transitions into an output beam carrying energy of said first transition line and a control beam carrying energy of said second transition line;

detector means coupled to said control beam for detecting said control beam and providing a control signal whose magnitude is dependent upon the intensity of said control beam; and control means coupled to said frequency control means and to said detector means and responsive to said control signal for generating said error signal whenever said control signal deviates from a predetermined magnitude to adjust the oscillating frequency of said transitions to minimize said deviation.

3. A frequency stabilized laser according to claim 1, wherein said resonant cavity comprises two spaced reflectors and wherein said frequency controlling means is a piezoelectric crystal mounted on one of said reflectors.

4. A frequency stabilized laser according to claim 2, wherein said control means including a DC amplifier responsive to said control signal to provide said error signal.

5. A frequency stabilized laser according to claim 4, wherein said control means further includes a control voltage amplifier and a bias source, said control voltage amplifier being responsive to said error signal from said DC amplifier and to a bias voltage from said bias source and having its output coupled to said piezoelectric crystal.

6. A frequency stabilized laser according to claim 1, wherein said laser oscillator is a $CO_2$ laser.

7. A frequency stabilized laser according to claim 1, wherein said laser oscillator is a rare earth fluoride laser.

8. A frequency stabilized laser according to claim 1, wherein there is included a mode selection filter disposed upstream of said dispersive means.

References Cited

UNITED STATES PATENTS 3,361,990   1/1968   Gordon et al. _____ 331—94.5

RONALD L. WIBERT, Primary Examiner

P. K. GODWIN, Assistant Examiner

U.S. Cl. X.R.

330—4.3; 332—7.51, 7.5